United States Patent

[11] 3,566,243

| [72] | Inventor | James P. Landis |
| | | Wauwatosa, Wis. |
| [21] | Appl. No. | 763,563 |
| [22] | Filed | Sept. 30, 1968 |
| [45] | Patented | Feb. 23, 1971 |
| [73] | Assignee | Pillar Corporation |
| | | West Allis, Wis. |

[54] HIGH FREQUENCY POWER SUPPLY
11 Claims, 16 Drawing Figs.

[52] U.S. Cl.................................................. 321/2,
321/4, 321/18, 321/69
[51] Int. Cl........................................................ H02m 5/40
[50] Field of Search.................................................. 321/2, 4,
18, 60, 65, 69, 61; 219/10, 75, 131 (R)

[56] References Cited
UNITED STATES PATENTS

| 3,248,635 | 4/1966 | Corey | 321/4 |
| 3,273,041 | 9/1966 | Strohmeier | 321/4 |
| 3,325,716 | 6/1967 | Gomi | 321/2 |
| 3,351,835 | 11/1967 | Borden et al. | 321/2X |
| 3,360,710 | 12/1967 | Barthold | (321)/(4UX) |
| 3,413,538 | 11/1968 | Hodges | 321/2 |
| 3,430,123 | 2/1969 | Corry et al. | 321/4X |
| 3,436,632 | 4/1969 | Tisserant et al. | (321)/(2) |
| 3,475,674 | 10/1969 | Porterfield et al. | 219/10.75X |

FOREIGN PATENTS

| 1,015,811 | 1/1966 | Great Britain | 321/2 |

*Primary Examiner*—William M. Shoop, Jr.
*Attorney*—Settle, Batchelder and Oltman ABSTRACT: A static, single-phase, alternating current supply for powering an inductive load. In a preferred embodiment, the load is an induction heating coil with parallel power factor correcting capacitors, but equivalent elements consisting of parallel connected inductance and capacitance may be incorporated in the system and any external load can then be powered. Adjustment of output power and/or voltage is accomplished by varying the frequency of the supply. The preferred embodiment includes an alternating current input of line voltage and frequency, a rectifier producing DC output voltage of substantially constant magnitude, an inverter capable of operation over a range of frequencies for converting the DC voltage to high frequency alternating current, and inductive reactance between the inverter and the load. The frequency of the inverter is controlled by an oscillator which has various inputs providing control functions.

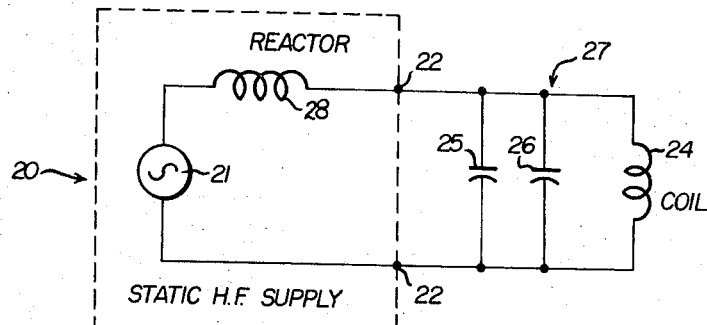
FIG.1
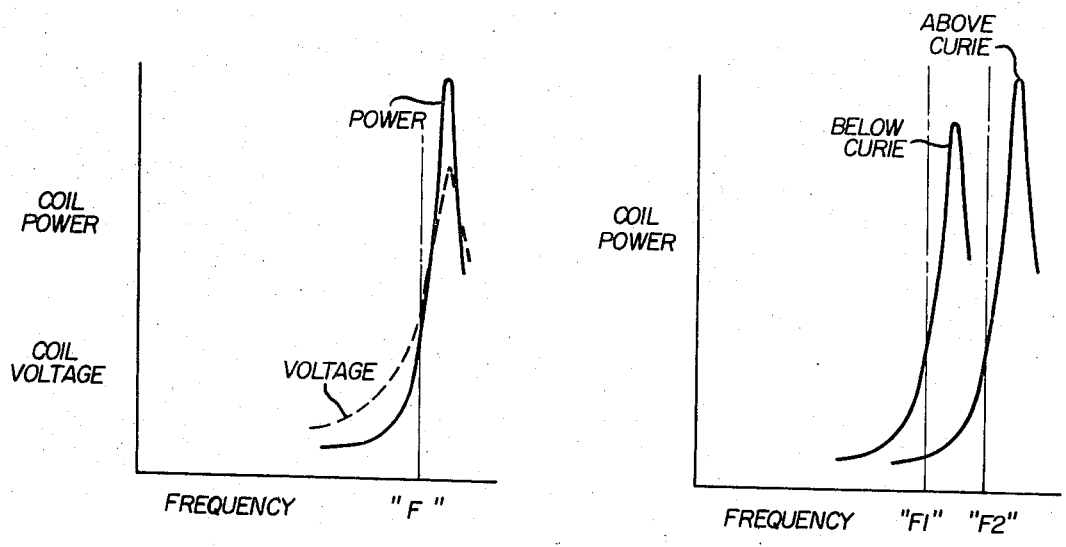
FIG.2
FIG.3
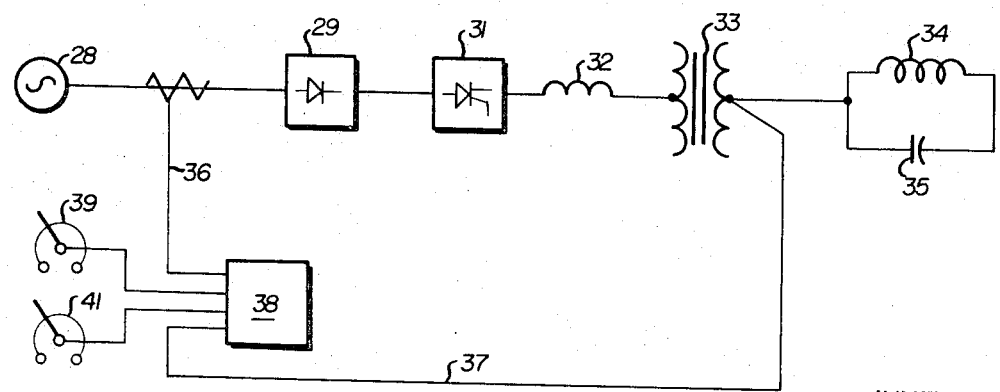
FIG.4
INVENTOR.
JAMES P. LANDIS.
BY
SETTLE, BATCHELDER & OLTMAN.
ATT'YS.

INVENTOR.
JAMES P. LANDIS.
BY
SETTLE, BATCHELDER & OLTMAN.
ATT'YS.

INVENTOR.
JAMES P. LANDIS.
BY
SETTLE, BATCHELDER & OLTMAN.
ATT'YS.

INVENTOR.
JAMES P. LANDIS.
BY
SETTLE, BATCHELDER & OLTMAN.
ATT'YS.

HIGH FREQUENCY POWER SUPPLY

BACKGROUND OF THE INVENTION

This invention relates to a static power supply for producing controllable high frequency alternating current. More particularly, it relates to a system wherein the degree of controllability and level of frequency attainable are compatible with the demands of induction heating processes and the like. The equipment is useful for producing power in the range of frequencies heretofore referred to as "machine frequencies" (having been produced by motor-alternator sets) as opposed to higher levels referred to as "radio frequencies."

The description of the invention will be directed primarily toward adaptation for induction heating. However, the use is not limited to this field, and other applications will be mentioned briefly.

Induction heating coils are characterized by very low power factor. Typically, levels of 0.05 to 0.5 are encountered owing to difficulty of ideal magnetic coupling into the workpiece. As a consequence of this low power factor, capacitor banks are generally connected in parallel with the coil for power factor correction. Such capacitor banks have heretofore been made variable since, in prior art systems utilizing motor alternators of substantially invariable frequency, the proper capacitance for power factor correction varies widely with the coil loading. For example, as a magnetic workpiece is heated through the Curie temperature (above which the magnetic properties are lost), the required capacitance for power factor correction may typically increase 25 to 50 percent. Costly switching means must therefore be provided to switch in (or out) many small increments of capacitance to maintain power factor correction as coil conditions vary.

A further problem which is encountered in prior art systems relates to the impedance level of the heating coil. A typical heating cycle may entail starting conditions wherein the impedance is low, thereby requiring relatively low coil voltage for the development of full power. As the workpiece heats up, impedance may rise (especially in passing through the Curie temperature) thereby demanding a substantial increase in coil voltage (typically 50 percent) for the maintenance of full power. Since alternators are characterized by the ability to develop full power only at full voltage, prior art systems have utilized tap-changing transformers or auto transformers for "impedance matching," again entailing costly switching means.

The switching functions associated with capacitors and impedance matching have generally been initiated by an operator. In the more highly variable loading conditions, for example, melting of iron or steel, the operator is required to exercise close scrutiny of system instrumentation and to react frequently and skillfully to select proper capacitance values and transformer tap settings.

In the heating of small parts (such as is encountered in heat treating applications), temperature and metallurgical changes occur very rapidly (a heating cycle may last only a few seconds). Under these conditions, an operator cannot react rapidly enough to make desired changes in capacitors or transformer taps. Hence, systems must be set up for an average condition wherein "matching" is a compromise and not optimum throughout the cycle. Average power available is therefore substantially less than the full equipment rating, thereby necessitating the use of oversized generating equipment.

An additional problem with prior art systems relates to controllability when heating parts of complex shape. For example, in heating treating an axle, the part is generally moved axially through an induction coil. As the axle is moved, the coil successively "scans" widely differing cross sections (typically: a journal, a spline, straight sections of varying diameter, and a portion of an end flange). Each type of section imposes a different loading condition on the coil, and in addition may demand a different level of power (dependent upon the heat treatment desired). Prior art systems have not been adequately responsive to permit the rapid changes required for optimum performance in such applications, again forcing compromises and considerable "trial and error" in the setup process.

It is an object of this invention to provide an improved high frequency power supply suitable for induction heating loads.

Another object is to provide a power supply of variable frequency to maintain proper load power factor without switching of corrective capacitors.

Another object is to provide a power supply capable of delivering substantially full power over a broad output voltage range.

Another object is to provide a power supply readily adapted to fully automatic control, thereby greatly reducing the skill demanded of operating personnel and increasing the uniformity of power input to the load.

Another object is to provide a power supply which responds rapidly to changing loading or to varying command signals for power or voltage level.

A further object is to provide a power supply which is fully static and thereby achieves improved levels of reliability, efficiency, controllability, etc. recognized for static equipment as contrasted with rotating machinery.

Other objects of this invention will appear in the following description and appended claims, reference being has had to the accompanying drawings forming a part of this specification wherein like reference characters designate corresponding parts in the several views.

ON THE DRAWINGS

FIG. 1 is a simplified functional diagram of the system, depicting the high frequency supply and a typical load;

FIG. 2 is a plot of load voltage and power vs. frequency for the system of FIG. 1;

FIG. 3 is another plot of load power vs. frequency for a typical load in each of two magnetic states;

FIG. 4 is a block diagram of a typical system illustrating both power and control elements;

Figure 5:
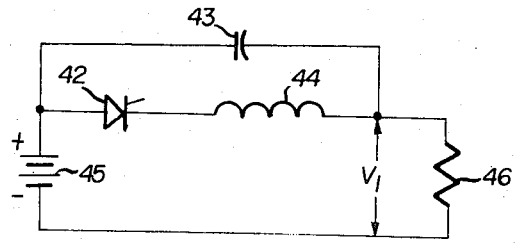
FIG. 5 is a circuit illustrating some of the operating principles of an inverter included in the system.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS TO THE DRAWINGS

The power supply 20 of FIG. 1 consists of a fixed voltage, variable frequency AC source 21 coupled to the output terminals 22 through a reactor 23. To the output terminals are connected a heating coil 24 and corrective capacitors 25 and 26 either directly as shown, or through a matching transformer or auto transformer (not shown). Coil 24 and capacitors 25, 26 form a parallel resonant tank circuit 27.

FIG. 2 illustrates the coil voltage and coil power characteristics available as the frequency of the static power supply is varied. The vertical line on FIG. 2 at frequency F denotes the frequency at which the power factor corrective capacitors 25, 26 tune the coil 24 to a condition of unity power factor. At this frequency, the system produces an intermediate level of power. As frequency is raised above this point, the power factor of the tank circuit 27 swings leading. Under this condition, the leading current passing through the reactor causes a voltage rise at the supply terminals, thereby increasing the voltage and power levels at the coil. Similarly, as frequency is reduced below level F, the power factor of the tank circuit swings lagging. The lagging current drawn through the series reactor 23 causes a fall-off in terminal voltage thereby reducing coil voltage and coil power, as depicted by FIG. 2. Note that for a typical system, as is normally encountered in induction heating practice, very little frequency change is required to swing from a low level of power to a high level of power.

FIG. 2 is drawn for a specific loading condition on the coil 24. However, where the loading condition on the coil varies owing to a billet or other type of workpiece passing through Curie temperature (or other metallurgical effect which radically changes the coupling between coil and workpiece), differences result.

FIG. 3 depicts two curves, similar to that of FIG. 2, representing operation above and below Curie temperature. Since the apparent inductance of coil 24 has changed radically, a given set of capacitors 25, 26 will produce unity power factor only at an appropriate frequency dependent upon the inductance of coil 24. Rather than change capacitors, it is possible with this system to change frequency to move into the proper range of power and voltage for either coil state. The automatic controls furnished with the system maintain the frequency at the appropriate level to develop the preset power or voltage desired, as will be described hereinafter.

FIG. 4 illustrates a block diagram of the principal system elements, both power and control.

The power system consists of the 60 Hz. alternating current input 28, a rectifier section 29 producing a substantially constant level of DC voltage, an inverter section 31 33, coil 34, and power factor corrective capacitors 35. For variable frequency alternating voltage and the series reactor 32. Also shown, are the output transformer 33, automatic control, two measurement points are utilized, as shown. These are, first, the 60 Hz. input current (as a measure of power), and second, the output voltage (as an over-voltage protective means). These signals are fed via lines 36 and 37 into the controlling oscillator system 38. In this latter system, they are balanced against preset levels of power and output voltage supplied from potentiometers 39 and 41 respectively. The oscillator system 38 automatically increases frequency until either the power or voltage set level is achieved, (as shown by FIGS. 2 and 3, increasing frequency causes increasing power, and increasing voltage). The normal mode of operation is on the power control, with the voltage control becoming limiting only when the preset level of power would call for a coil voltage in excess of the safe level for the coil 34 or capacitors 35. Note from FIGS. 2 and 3 that a peak point exists beyond which an increasing frequency produces a decreasing power and voltage. Not shown on FIG. 4 is a control feature which senses that the system is operating at the peak of the power capability and automatically prevents increase of frequency above this point. Thus, in the case of a very poorly coupled workpiece, the system will produce the maximum power possible for the prevailing conditions, even though the power set point is somewhat higher.

INVERTER THEORY

Figure 6:
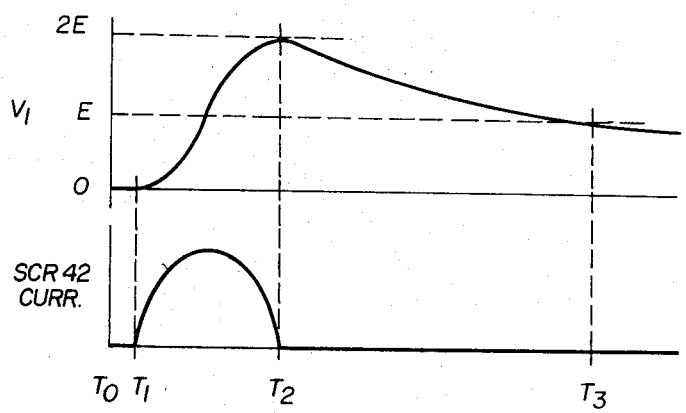
FIG. 6 illustrates voltage and current waveforms for the circuit of FIG. 5.

The inverter operation can be understood by first examining several simplified circuits utilizing the same principle. FIG. 5 illustrates such a circuit, while FIG. 6 depicts some of the waveforms. In FIG. 5, SCR 42, inductor 44 and resistor 46 are connected in a series loop with battery 45. Capacitor 43 is connected across SCR 42 and inductor 44.

Assume that at time $T_0$ (FIG. 6) SCR 42 is not conducting, but the circuit has been energized long enough for capacitor 43 to be fully charged to the voltage E of battery 45. When SCR 42 is fired at $T_1$ (by a brief gate pulse), capacitor 43 rapidly discharges around the loop consisting of capacitor 43, SCR 42, and inductor 44. This reverses the polarity on capacitor 43 and swings the potential $V_1$ to approximately 2E, as shown. The current pulse through SCR 42 is also depicted. At time $T_2$, the current through SCR 42 has diminished to zero, thereby extinguishing the SCR. Note that the voltage across the SCR will be in the reverse direction until some later time $T_3$ when the current flowing from capacitor 43 through resistor 46 has brought the level of $V_1$ down to the level E. After $T_3$, SCR 42 will experience forward voltage. The interval from $T_2$ to $T_3$ is referred to as the turnoff time (TOT). This is the time interval during which the SCR is reverse biased following conduction, and during which the SCR can regain its ability to block forward voltage. The TOT must be maintained longer than some specified minimum value, for any given SCR, to prevent breakover when forward voltage is reapplied. Thus, the circuit of FIG. 5 would operate satisfactorily only if the resistance of resistor 46 were sufficiently high. Lowering this resistance would obviously reduce the TOT (time interval $T_2$-$T_3$).

Figure 7:
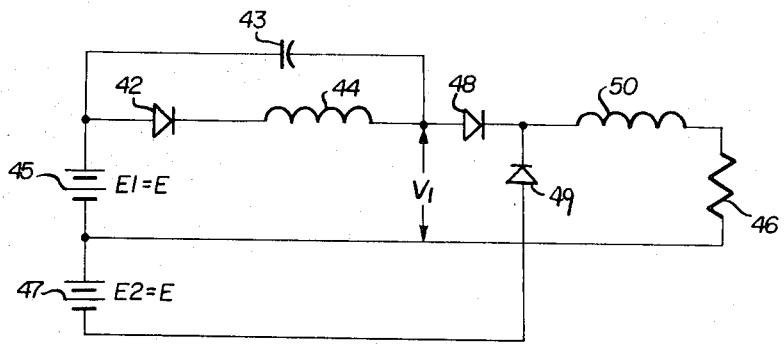
FIG. 7 is a circuit further illustrating some of the operating principles of the inventor.
Figure 8:
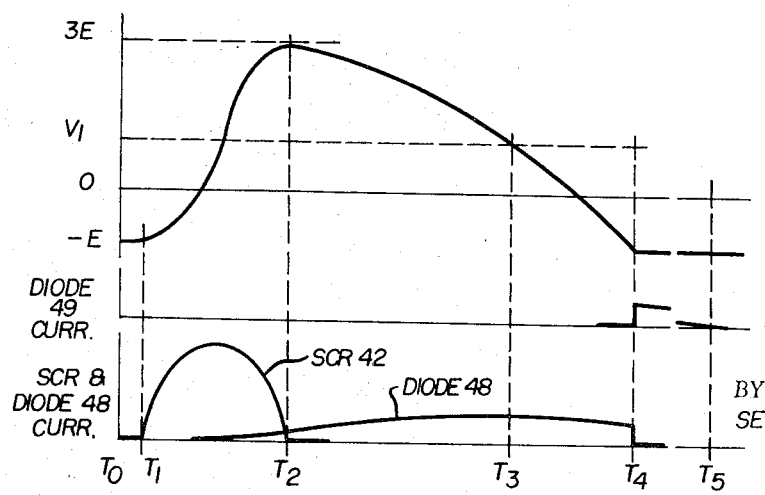
FIG. 8 illustrates voltage and current waveforms for the circuit of FIG. 7.

FIG. 7 illustrates the circuit of FIG. 5 with certain elements added. Inductor 50 is much higher in inductance than inductor 44 and the resistance of resistor 46 is low enough so that impedances 43, 50 and 46, constitute an underdamped oscillatory circuit. Voltage E2 (battery 47) is equal to E1 (battery 45), both being equal to E. FIG. 8 shows waveforms for this circuit.

Assuming $V_1$ to be at the level −E at time $T_0$ the actual voltage across capacitor 43 is 2E. When SCR 42 is fired, the discharge of capacitor 43 around the loop including elements 43, 42 and 44 will, as in the previous case, essentially reverse the voltage on capacitor 43. Thus, voltage $V_1$ will be about 3E, as shown by FIG. 8 at $T_2$, the end of the conduction period of SCR 42. After SCR 42 extinguishes, the current flow from capacitor 43 through diode 48, inductor 50 and resistor 46, will again reverse the polarity of the capacitor and swing $V_1$ toward zero. Since elements 43, 50 and 46 form an oscillatory circuit, $V_1$ will actually reverse potential and would tend to swing toward about −3E if the resistance of resistor 46 were zero. However when $V_1$ reaches a level of −E, diode 49 conducts, thereby preventing $V_1$ from exceeding a negative potential greater than −E. Thus, the charge on capacitor 43 remains constant beyond $T_4$ (at a level of 2E volts) while the remaining energy in inductor 50 is dissipated by current flow through diode 49, inductor 50 and resistor 46. At $T_5$ this current flow ceases. At this time, diode 48 prevents a reversal of current through resistor 46 and inductor 50. Note that after $T_5$, conditions are the same as assumed to $T_0$, and the cycle can be repeated.

Figure 9:
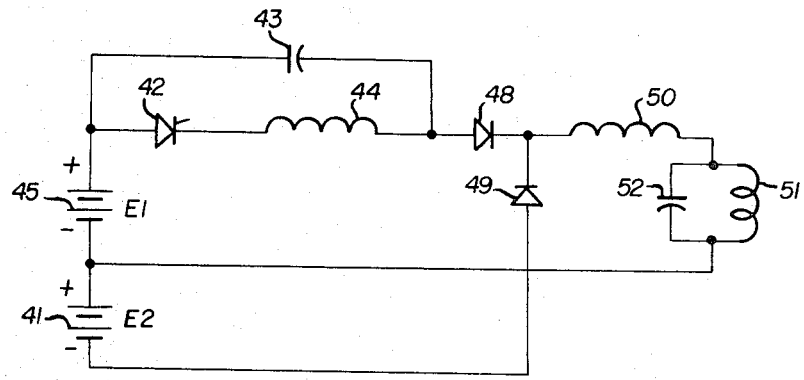
FIG. 9 is a circuit further illustrating some of the operating principles of the inverter.

FIG. 9 illustrates the circuit of FIG. 7 with the resistor 46 replaced by a load coil 51 and power factor corrective capacitor 52 forming a tank circuit. This circuit will operate with waveforms similar to FIG. 8. The principal difference lies in the exact shape of the voltage and current wave forms from $T_2$ to $T_5$. Those of FIG. 9 will be more complex owing to the substitution of capacitor 52 and load coil 51 for resistor 46.

The circuit of FIG. 9 could be used as it stands for induction heating. Two basic problems exist however:

1. A DC component of current must flow into the tank circuit (diodes 48 and 49 permit current flow through inductor 50 in only one direction). Coupling to the tank circuit would therefore be difficult.

2. A DC supply consisting of two voltages such as E1 and E2 would be difficult to provide.

Figure 10:
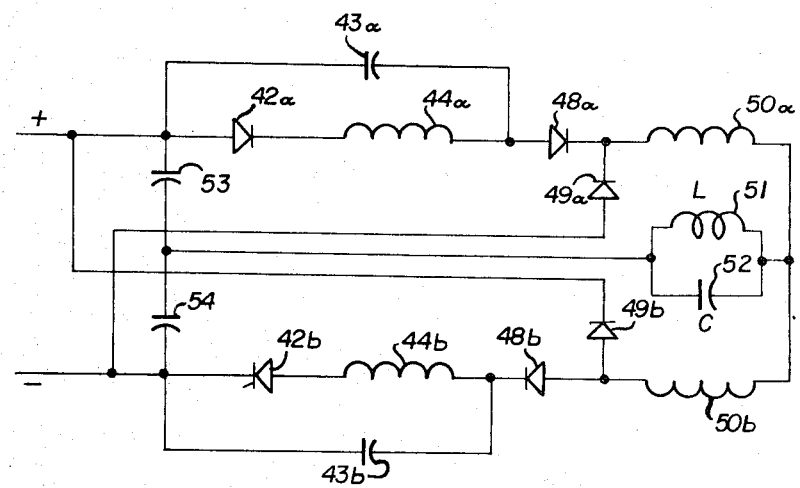
FIG. 10 illustrates the inverter circuit in a preferred embodiment complete with a typical load.

The previous objections are overcome by combining two systems of the type shown in FIG. 9 to drive a single tank circuit, as shown by FIG. 10. The series-connected voltages E1 and E2, are here obtained by a capacitor voltage divider 53 and 54 (capacitors 53 and 54 are considerably higher in capacitance than capacitors 43a and 43b). Note that the DC component in inductor 50a can now flow through inductor 50b rather than into the tank circuit (in fact, the DC component cannot flow into the tank circuit since the latter terminates in the capacitor divider 53 and 54). Transformer coupling to the tank is therefore readily accomplished.

The DC input to the circuit of FIG. 10 can be furnished by a simple diode rectifier bank. Capacitors 53 and 54 serve as a filter capacitor bank (as well as divider) to prevent drawing high frequency currents from the rectifier (and hence, from the incoming power lines).

An equivalent circuit for the rectifier-inverter system is illustrated by FIG. 1. The reactor 28 of this circuit corresponds to the two reactors 50a and 50b (in parallel) of FIG. 10.

FIGS. 2 and 3 illustrate power and voltage output characteristics with varying frequency of operation. The frequency at which peak power occurs is approximately the resonant frequency of the "tank" consisting of coil 52 and capacitor 51.

The control for this system must:

1. Control power or output voltage by properly adjusting frequency.

2. Avoid increasing frequency beyond the "peak" point where increasing frequency produces less rather than more power.

3. Recognize that SCR TOT decreases with increasing power output and avoid operation under conditions of inadequate TOT.

4. Avoid firing one SCR if the previously fired SCR has not turned off and is still in the conducting state.

The manner of accomplishing these requirements is discussed hereinafter.

Failure of an SCR to turn off properly does not cause a fault on the DC supply if the opposite SCR is not fired while the is still on. For example, referring to FIG. 10, assume SCR 42a has failed to turn off after a normal firing. Sustained conduction of SCR 42a will ultimately result in a complete discharge of capacitor 53 and an increase of the charge on capacitor 54 to full DC bus voltage. If SCR 42b is not fired during this time, once capacitors 53 and 54 have reached the levels mentioned above, current will cease to flow through SCR 42a and it will extinguish. A protective circuit which prevents firing SCR 42b while SCR 42a is on can, therefore, prevent fuse blowing and limit the above condition to a momentary interruption.

BASIC OPERATING PRINCIPLE OF THE CONTROL

As previously described, the controlling feature of the system is the frequency at which the SCRs are fired. This frequency is determined by the oscillator, the frequency of which is controlled by a number of inputs. Since the frequency of the system is the only controlling feature, all controlling inputs operate on the oscillator to adjust its frequency.

Figure 11:
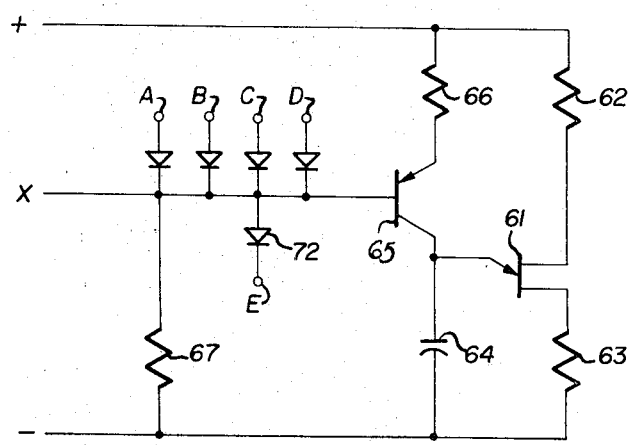
FIG. 11 is a simplified diagram of an oscillator included in the system and illustrates the principle of frequency control.

This can best be described by a reference to FIG. 11 which illustrates the principle of oscillator control. FIG. 11 depicts a conventional unijunction oscillator consisting of unijunction transistor 61 in combination with resistors 62, 63 and capacitor 64. Capacitor 64 is charged by a current source consisting of transistor 65 and resistor 66. As this charge builds up, unijunction transistor 61 fires, and capacitor 64 discharges to a level where transistor 61 cuts off.

The control of frequency is effected by adjustment of the voltage on the base of transistor 65, that is, the adjustment in potential of conductor X. As shown, and in the absence of signals entering at terminals A, B, C, or D, the potential of conductor X would be pulled negative by resistor 67, thereby making transistor 65 conductive producing a high current output from the current source. This, in turn, would produce a high frequency of operation on the part of the unijunction oscillator circuit. If a positive signal is applied, for example, at terminal A, the potential of conductor X can be pulled positive. This, in turn, reduces the current output of the current source, thereby decreasing the frequency of the oscillator. Thus, it can be seen, that a positive input at any one of the terminals A through D, can operate to reduce the frequency. Obviously this principle can be extended to any number of such inputs, the four shown (A through D) being entirely arbitrary. The important feature to recognize here is that any one of these inputs can operate to reduce frequency and hence become the limiting control element. In the absence of any inputs A through D, the frequency will move to a high level; an input serves only to limit or reduce the frequency.

In the actual circuit modules to be described later herein, some of the inputs to conductor X are introduced by way of diodes 68—71 as shown in FIG. 11. Other inputs to conductor X are introduced by way of the base-emitter junctions of transistors. Either method produces the same results. The controlling inputs used in the equipment are eight in number and are responsive to the following:

1. "Start-Stop" Circuit
2. "Trip" Circuit
3. "Power Level" Control
4. "Inverter Output Voltage" Control
5. "Coil Voltage" Control
6. Maximum Frequency
7. Phase
8. SCR TOT (turn off time)

FIG. 11 also illustrates an input E to conductor X, its diode 72 being oppositely polarized. An input at E can be used to limit the positive potential of conductor X in the presence of an input to A through D. Such a limitation will limit the oscillator frequency to some minimum level. One such input is incorporated in the control system, and is used to set the minimum frequency at which the oscillator can be caused to run.

Conductor X threads through a number of the modules, the inputs corresponding to A through E of FIG. 11 actually being derived from three separate modules. The manner of deriving these signals, and the intervening parts between the oscillator and the SCRs are described in detail in subsequent sections of this specification.

SYSTEM BLOCK DIAGRAM —AC LINE CONTACTOR ARRANGEMENT

Figure 12:
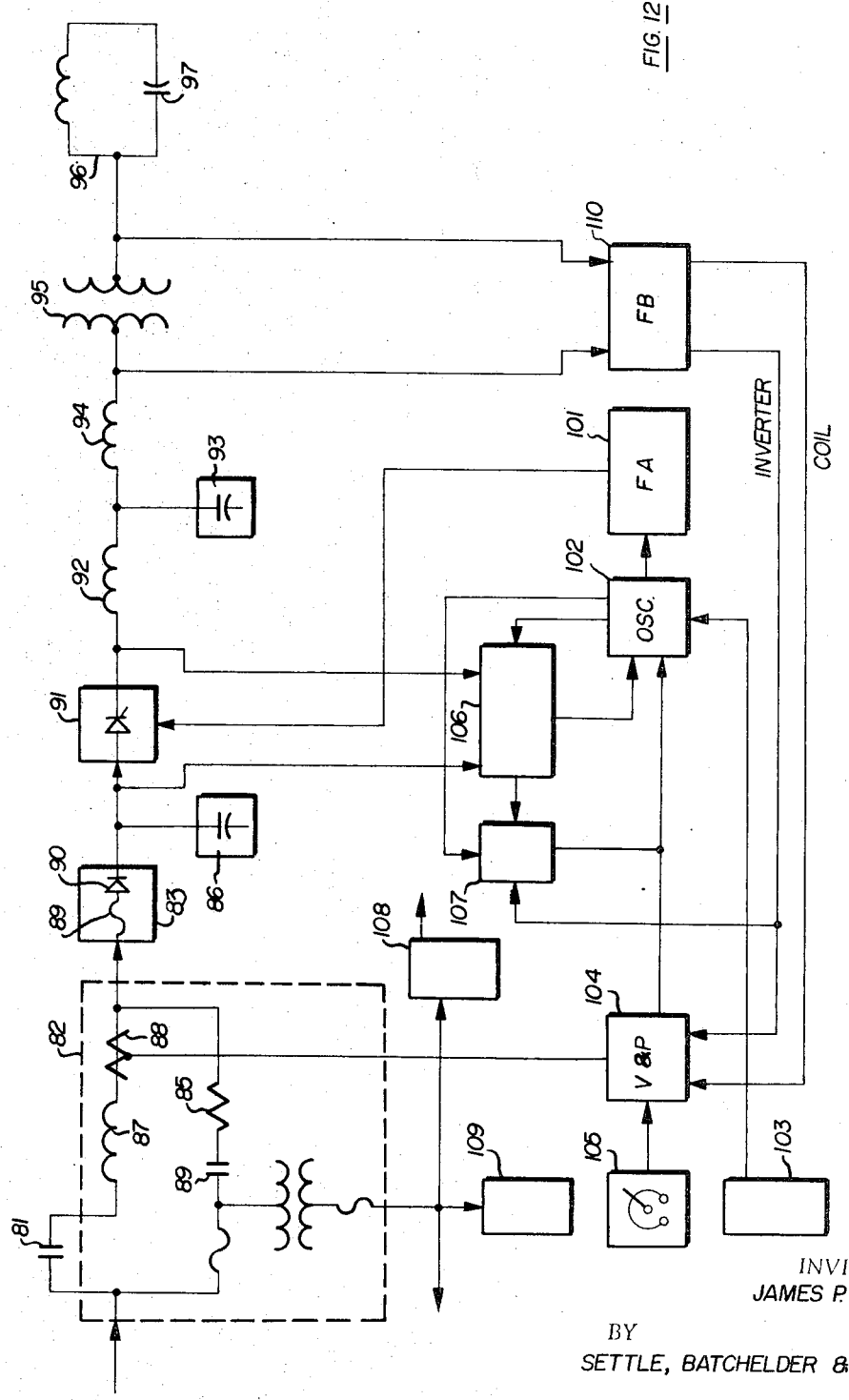
FIG. 12 is a block diagram showing various modules provided in a preferred embodiment of the system.

FIG. 12 illustrates the entire system of one practical embodiment in block diagram form. In this FIG., the elements shown in the block sometimes represent schematically a plurality of actual circuit components.

Line power (460 volts, 60 Hz, 3-phase) flows by way of the line contactor 81 and the magnetic panel 82 to the diode module 83. Contactor 84 is provided to permit initially energizing the diode rectifier 83 by way of the series resistors 85. This charges the filter capacitors 86 on the output of the rectifier slowly and prevents a surge as well as an overshoot in capacitor voltage. Contactor 81 provides the power path after initial charging. In series with contactor 81 are the line reactors 87, for intercepting transient line voltages, and current transformers for monitoring line current.

Entering the diode module 83, by way of high speed power fuses 89, the AC power is converted to DC at about a 650 volt level by diodes 90 and impressed across the filter capacitors 86. These capacitors are not intended to smooth the rectified power, but rather to furnish the high frequency AC current drawn by the inverter and thus bypass most of this current from the incoming lines. (The previously mentioned line reactors 87 also serve to block this current from the incoming lines).

The inverter, comprising the SCR module 91, reactors 92, capacitors 93, and reactors 94 (as well as several diodes in diode module 83) converts the DC power to variable frequency AC power. This is fed by way of transformer 95 to the load circuit 96. The capacitors 97 may be connected on the secondary side of the transformer 95 (as shown), or on the primary side. Coil 98 and capacitors 97 may be supplied by the user of the power supply system.

Once energized by contactor 81, the system delivers or interrupts power and controls level of delivered power by controlling the SCR firing signals. These signals are established by the control elements also illustrated on the block diagram.

SCR firing signals are furnished by the firing amplifiers 101. The frequency of the output is determined by the frequency of these firing impulses. This frequency determines voltage and power at the load. Since the firing amplifiers are driven by the oscillator 102, this latter element is the heart of the control system. The balance of the control system energizes or deenergizes the oscillator and dictates its frequency of operation.

The system is turned on and off statically by means of the pushbutton control 103 associated with the oscillator. Relays can be substituted for pushbuttons if desired. Another pushbutton control 109 may be provided for operating contactors 81 and 89.

The primary control for the oscillator is the voltage and power regulator 104. This regulator compares the set point voltage on the power potentiometer 105 with the feedback via module 110 from the line current transformer 95 (as a measure of power). The output to the oscillator raises or lowers frequency to keep the set point and feedback in balance.

The regulator 104 also accepts voltage feedback signals from the feedback module 110 (this module merely incorporates two potential transformers) and compares them against internal limiting setting potentiometers. Thus, reaching a limiting level of voltage will cause the regulator 104 to limit frequency even through set power is not being developed.

The lockout and TOT (turn-off time) module 106 and limit module 107 monitor the system behavior and override the regulator 104 either to limit frequency or trip the system off when set level of power cannot be achieved safely. Specific functions are:

Lockout and TOT module 106:
a. Trips unit if an SCR group fails to block forward voltage.
b. Continuously monitors SCR TOT and initiates power limiting if TOT becomes too short.

Limit module 107:
a. Operates in conjunction with lockout and TOT module 106 to limit power when TOT becomes too short.
b. Prevents frequency from advancing above optimum value when load impedance is too low to achieve set power level.
c. Incorporates set potentiometer for maximum system frequency.
d. Incorporates set potentiometer for minimum system frequency. The B supply module 108 converts 115 volt AC control power into low voltage DC power for all the above-mentioned control modules.

OSCILLATOR AND FLIP-FLOP MODULE

Figure 13:
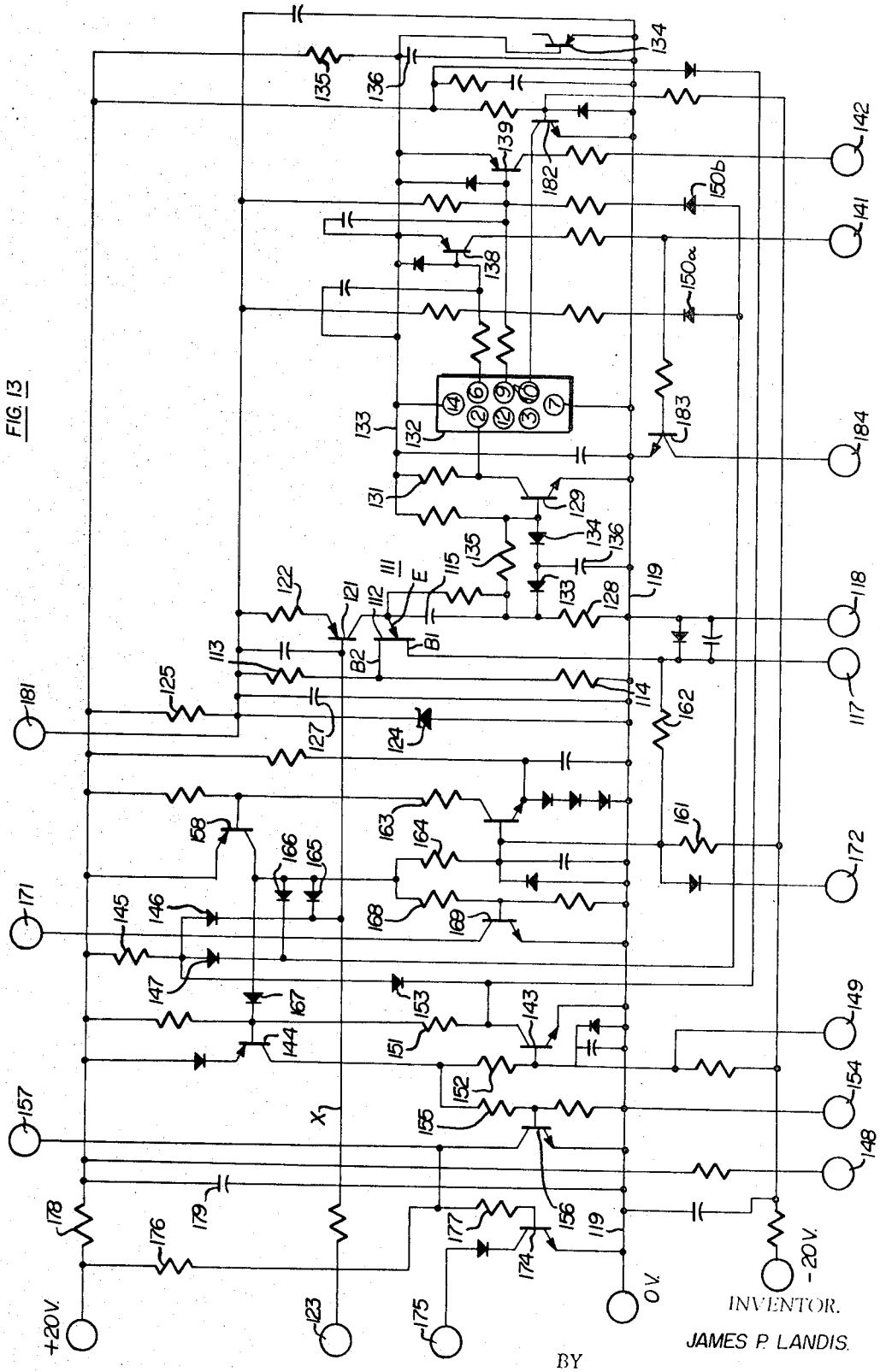
FIG. 13 is a circuit diagram of an oscillator and flip-flop module included in the system of FIG. 12.

As previously described, the oscillator is the heart of the control system. In the illustrated embodiment, the oscillator and flip-flop module 102 contain the following elements as shown in FIG. 13:

1. Unijunction oscillator
2. Integrated circuit flip-flop and flip-flop driver
3. Two output amplifier stages
4. "On-Off" transistorized relay
5. Transistorized trip circuit
6. Lamp drivers for "On" and "trip" lamps.
7. Transistorized shorting switch for power potentiometer
8. Regulated +6 volt and +15 volt power supplies for operation of module elements
9. Driver stage for frequency meter The unijunction oscillator 111 consists of unijunction transistor 112 having a base B2 fed from voltage divider 113,114 and emitter E fed from capacitor 115 and resistor 116. External circuitry normally provides what is essentially a short circuit between pins 117 and 118, thereby tying base B1 of transistor 112 to the zero potential line 119. Charging current for capacitor 115 is provided by the current source consisting of transistor 121 and resistor 122. The controlling input to the current source is at the base of transistor 126, fed from pin 123 and intervening circuitry. This latter line corresponds to conductor X as described in the section "Basic Operating Principles of the Control." A zener regulated bus is provided for the unijunction oscillator. This consists of 15 volt zener diode 123 driven from the 20 volt supply 126 through resistor 125. Capacitor 127 acts as a filter capacitor for this 15 volt regulated bus.

The output of the unijunction oscillator is taken across resistor 128 and consists of negative-going spikes occurring each time transistor 112 fires and discharges capacitor 115 through its emitter. The negative-going spikes across resistor 128 provide momentary turn-off signals to the base of transistor 129 (which is normally in the "on" condition by way of resistor 131.) The momentary "off" signals on transistor 129 base provide for momentary positive-going spikes at the collector of this transistor, these being the trigger input signals to pin 2 of integrated circuit flip-flop 132. The circuitry consisting of elements 133, 134, 135 and 136 serves to introduce a pulse stretching function into the drive of the base of transistor 129, providing for a longer "off" period at the base of this transistor than would prevail simply under the influence of the negative pulse on resistor 128.

The integrated circuit flip-flop 132 and associated circuit elements are fed from a regulated +6 volt bus 133 (connected to pin 14 of the integrated circuit.) The +6 volt bus 133 is regulated by the base to emitter junction of transistor 134 (far right) acting as a zener diode, the bus being fed by resistor 135 from the +20 volt supply. Capacitors 136 and 137 serve as filter capacitors for the +6 volt bus, the latter capacitor being shown next to the integrated circuit.

The outputs of integrated circuit flip-flop 132 appear at pins 6 and 9 of the flip-flop. These outputs vary from zero to +6 volts and switch state at each trigger pulse entering pin 2. The outputs of pin 6 and 9 are 180° out of phase with each other, and one complete cycle at the output of either of these pins requires two input pulses at pin 2. Therefore, to produce 3KC operation at the output of the flip-flop requires that the unijunction oscillator 111 run at 6KC. The outputs of integrated circuit pins 6 and 9 drive transistors 138 and 139 respectively. These transistors are tied respectively to pins 141 and 142 to which are externally connected the inputs to the main firing amplifier module. Transistor 139 provides firing signals for a positive SCR or group of SCRs represented by SCR 42a in FIG. 6 while transistor 138 provides firing signals for a negative SCR or group of SCRs represented by SCR 42b in FIG. 6. The firing amplifiers are conventional and are not shown in detail.

Referring to the left side of FIG. 13, transistors 143 and 144 constitute a "transistor relay" which must be energized to start the oscillator. In the deenergized state, both transistors 143 and 144 are in the "off" condition. Under these circumstances, a circuit is provided through resistor 145 and diode 146 to positively bias conductor X and the base of transistor 121. This positive bias is sufficient to cut off the current source and prevent the oscillator 111 from operating. In addition, a second diode 147 is fed through resistor 145. The signal through diode 147 passes by way of diodes 150a and 150b to positively bias the bases of transistors 138 and 139. Thus, with transistors 143 and 144 in the "off" condition, the unijunction oscillator 111 is stopped, and the output amplifiers leading to output terminals 141 and 142 are positively cut off.

The relay including transistors 143 and 144 is energized by means of an external pushbutton or relay 103 (FIG. 12) which completes the circuit from pin 148 to pin 149, either continuously or momentarily. Completing this circuit, provides base drive for transistor 143, thereby turning 143 "on." This provides base drive for transistor 144 through resistor 151 thereby turning transistor 144 "on." Transistor 144, in turn, provides additional base drive for transistor 143 through resistor 151. Thus, after transistor 144 is energized, the circuit from pin 148 to pin 149 can be removed and the "relay" will remain energized. When transistor 143 is energized, a circuit is provided through diode 153 which pulls the lower end of resistor 145 to essentially zero volts, thereby reverse biasing diodes 146 and 147. Reverse biasing the latter two diodes "releases" both the input to the unijunction oscillator and output amplifiers.

To turn the system "off" an external connection is made between pin 154 and pin 149. This shorts the base of transistor 143 to zero volts, thereby cutting off this transistor. This in turn cuts off transistor 144 and removes the base drive for transistor 143. The connection between pin 154 and pin 149 can then be removed and the transistor relay will remain in the "off" state.

When the transistorized relay is energized, a circuit is provided through resistor 155 to the base of transistor 156, thereby energizing this transistor. Transistor 156 connected by way of pin 157 to an externally mounted indicating lamp which is thereby energized when the transistorized relay is "picked up" and the unit is in an "on" state.

Transistors 158 and 159 constitute another transistorized relay operating as a "trip" circuit. In normal operation, transistor 158 and transistor 159 are in the "off" state, and the base transistor 159 is slightly reverse biased through resistor 161. A tripping signal consists of a positive-going pulse on the base of transistor 159 by way of resistor 162. The mechanism for generating this pulse will be discussed later. When such a signal appears at the base of transistor 159, it is turned on, thereby energizing transistor 158 through resistor 163. Transistor 158 in turn provides additional base current through resistor 164 for transistor 159 thereby locking it in the "on" state. When transistor 158 is thus turned "on" a circuit is established from its collector through diode 165 to positively bias conductor X leading to the base of transistor 121 and thereby cut off the unijunction oscillator. An additional circuit is provided through diode 166 which, by way of diodes 150a and 150b, reverse biases transistors 138 and 139, thereby cutting off any firing signals at the output pins 141 and 142. Note that this action is identical to that which occurs when the transistorized relay 143, 144 is turned off. A third circuit is provided from the collector of transistor 158 through diode 167 to the base of transistor 144. This circuit positively biases the base of transistor 144, thereby cutting this transistor "off." Cutting off transistor 144 will cut off transistor 156 (thus extinguishing the "on" lamp) and will also cut off transistor 143 if the circuit between pin 149 and pin 148 is by way of a momentary contact. If the circuit from pin 149 to pin 148 is through a maintained contact or relay contact, transistor 143 will remain energized. Whether it remains energized or not, the unijunction 112 and the output are nevertheless deenergized by way of diodes 165 and 166.

Generation of the tripping signal into the base of transistor 159 is accomplished as follows: In the lockout and TOT module 106 a pulse transformer is provided, the primary of which completes the circuit between pins 117 and 118, by way of interconnecting wiring. Under normal and proper circumstances, the secondary of the pulse transformer is shorted, thereby permitting pulses from base B1 of unijunction transistor 112 to flow through the primary to zero volts with substantially no voltage generated across the primary. Under these conditions, the positive voltage at pin 117 (relative to 118) is very low and insufficient to turn on transistor 159 by way of resistor 162. When, however, the conditions at the SCRs of the inverter (FIG. 6) are improper and firing should not occur (as discussed in greater detail hereinafter), the short is removed from the pulse transformer secondary thereby creating a high impedance circuit between pins 117 and 118. Thus when the unijunction transistor 112 fires, the discharge of capacitor 115 through the unijunction transistor and hence by way of base B1 through pin 117, creates a positive voltage at pin 117 of about 6 volts. This is sufficient to energize transistor 159 through resistor 162 and trip the circuit. An additional safeguard is provided in that the impedance between pins 117 and 118, under these conditions, is sufficiently high that only a small voltage is developed across resistor 128. This voltage is inadequate to turn off transistor 129. As a consequence, the trigger pulse is not transmitted to integrated flip-flop 132 and a firing does not occur.

When the trip circuit is energized, the collector of transistor 158 also provides a circuit through resistor 168 to the base of transistor 169 which is the driver transistor for the externally mounted "trip" lamp. This lamp therefore is energized whenever the circuit is in the tripped condition. The lamp is connected to pin 171.

Following tripping, the trip circuit can be reset to permit normal running only by completing the circuit from pin 172 to pin 154 by means of an external pushbutton or relay. Completing this circuit grounds the base of transistor 159 through diode 173 thereby cutting off transistor 159 and, in turn, transistor 158.

Transistor 174 (far left) is provided as a transistor switch for shorting out the reference signal from the power set pot 105 when the system is in the "off" condition. This is accomplished by external wiring from the power pot wiper to pin 175. When the "on-off" relay 143, 144 is deenergized, a circuit is provided through resistors 176 and 173 to the base of transistor 174. This turns on transistor 174 and shorts the power set pot. When transistors 143 and 144 are energized, transistor 156 is in turn energized providing a path to ground from the top of resistor 177 through transistor 156 which cuts off transistor 174. This releases the short on the power pot and permits the power reference signal to be applied to the voltage and power regulator module 104.

The remaining elements in FIG. 13 not so far discussed are as follows. Resistor 178 and capacitor 179 constitute a decoupling circuit for the +20 volt power on this module. Pin 181 provides a +15 volt regulated supply for the limit module 107. Transistor 182 serves as a means for grounding pin 10 on flip-flop 132 when the circuit is in the "off" condition. Grounding pin 10 presets the integrated circuit flip-flop so that it is always in the same state when the unit is subsequently started. This assures firing the same SCR or group of SCRs (the positive SCR 42*1*) first, when the unit is started. Transistor 183 provides a driver stage for an external frequency meter at pin 184 (if used) to indicate system operating frequency. Certain other elements in the circuit of FIG. 13 provide biasing, filtering and other functions having no relation to the invention, so these elements will not be described.

VOLTAGE AND POWER REGULATOR MODULE

Figure 14:
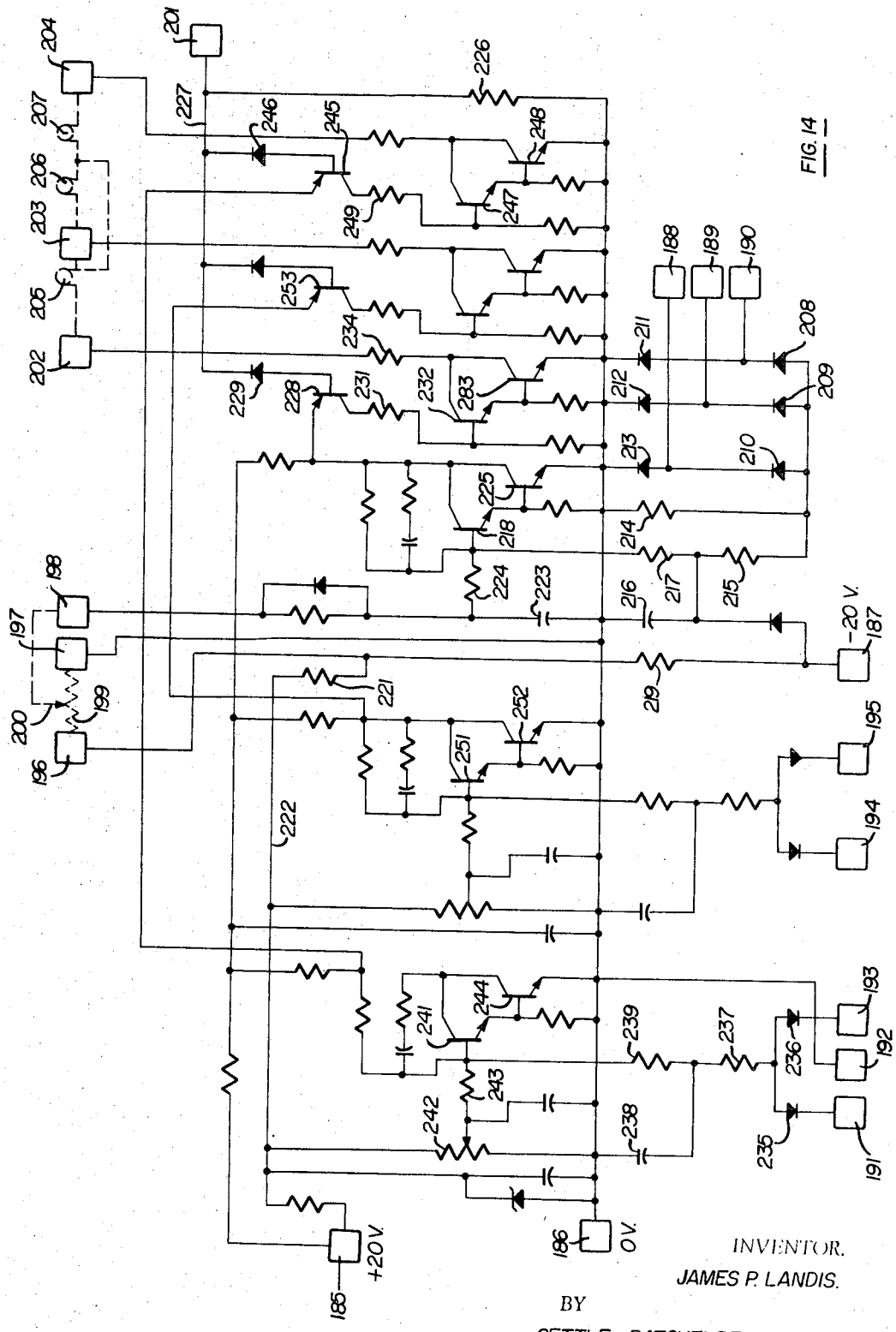
FIG. 14 is a circuit diagram of a voltage and power regulator included in the system of FIG. 12.

The primary function of the voltage and power regulator 104 (FIG. 12) is to maintain a preset power output from the equipment by comparing a feedback signal proportional to power with a reference setting on the power set potentiometer 105. A secondary function for the module is to provide voltage limiting by comparing feedback voltage levels at the output of the equipment with preset limit settings on the potentiometers integral with the module 104. Power control and voltage limiting are accomplished by control of the frequency of oscillator 102 from the output of the regulator 104. A circuit for the regulator is shown in FIG. 14. The supply power for this circuit is introduced at pins 185, 186 and 187. Feedback signals are introduced at pins 188, 189, 190 (for power), 191, 192, 193 and 194,195 (for voltage). The power pot 199 is connected at pins 196,197 and 198, the output at pin 201 and indicating lamps 205,206 and 207 at pins 202,203,204.

Operation of the power regulating function will be described first. The feedback for the power control consists of the outputs of the current transformers 88 in the 60 cycle input lines (located on the magnetic panel 82). The input to each of pins 188, 189 and 190 is therefore proportional to the 60 cycle line current entering the power equipment. These current inputs are rectified by the bridge rectifier consisting of diodes 208, 209, 210, 211, 212 and 213, the output of this rectifying bridge being impressed on resistor 214. A DC voltage is therefore created across resistor 214 which is proportional to current in the lines and which is negative at the bottom of resistor 214. The voltage across this resistor is filtered by the circuit consisting of resistor 215 and capacitor 216 and introduced into the base of transistor 218 through resistor 217. This feedback signal at the base of transistor 218 is compared with a reference signal.

The reference signal is derived from the external power set potentiometer 189 connected to pins 196, 197, and 198. This pot is powered from the voltage divider consisting of resistors 219 and 221. The function of this divider is to provide line voltage compensation. As the line voltage rises, the magnitude of the −20 volt signal introduced at pin 187 increases. This pulls the bottom end of the resistor 221 increasingly negative whereas its top end is tied to a zener regulated 15 volt bus 222. Thus an increasing amplitude of input voltage decreases the positive signal on pin 196 and reduces the total voltage across the pot 199. This action provides for a reduced current (and hence power) reference when the line voltage is high and vice versa. The wiper 200 of the pot is connected by way of pin 198 to capacitor 223 for filtering, and thence by way of resistor 224 to the base of transistor 218.

A balance is thus provided between the signal in resistor 224 and the signal in resistor 217 at the base of transistor 218. The current in resistor 224 tends to turn on the transistor pair 218 and 225, whereas the current in resistor 217 (being negative) tends to turn these transistors off. As will be shown shortly, turning on transistors 218 and 225 increases the frequency of the system and increases the power output. Thus, if the reference signal is greater than the feedback (indicating power is not up to set point) transistors 218 and 225 will be turned on. Conversely, if the feedback exceeds the reference, transistors 218 and 225 will be partially turned off, thereby reducing the frequency and the delivered power.

Assume for the moment that the reference signal exceeds the feedback signal. In this case, transistors 218 and 225 will be turned on, and the collector of transistor 225 will swing negative. This action in turn will tend to permit the output at pin 201 to swing negative through resistor 226. As previously discussed, pin 201 is externally connected to conductor X of the oscillator 111 (FIG. 13) and upon swinging negative increases the frequency of the oscillator. If some other input to the line 227 connected to the pin 201 is holding this line at a positive level and thereby limiting frequency, a negative-going signal at the collector of transistor 225 will simply reverse bias the base to emitter junction of transistor 228 and diode 229, effectively disconnecting the output of the power amplifier from the line 227 connected to pin 201.

If no other input to the line 227 on pin 201 is holding this line positive, then a circuit will be established through the emitter to base junction of transistor 228 and diode 229 to establish the positive potential of pin 201. This potential will be permitted to swing negative until the oscillator frequency reaches a level corresponding to the desired level of power. At this point in the feedback through pins 188, 189 and 190 will increase to a level providing a balance at the input to the base of transistor 218. The output of the transistors 218 and 225 will therefore become fixed at the appropriate level to maintain the power as preset. Under these conditions, the current flow through the emitter to base junction of transistor 228 will turn on this transistor providing a drive through resistor 231 to the transistor pair 232, 233. This turns on the external power lamp 205 (connected to pin 202) through resistor 234. Illumination of this lamp indicates that the system is on power control. If some other input to the line 227 connected to pin 201 is holding this line positive, and the power amplifier 218,225 is not "satisfied," the common collector of transistors 218 and 225 will swing sufficiently negative to reverse bias transistor 228. This cuts off transistor 228 and removes the base drive to transistors 232 and 233 and extinguishes the lamp 205. This indicates that some other function is controlling, and the system is not at the power set point.

The voltage control action is almost identical to the power control action just described. The difference lies in the use of a voltage feedback from either the "inverter" or "coil" potential transformer in place of the aforementioned feedback. For example, in the case of the "inverter" feedback, potential transformer signals are introduced into pins 191, 192 and 193. The signal is full wave rectified by diodes 235 and 236, producing a negative voltage at the bottom of resistor 237. This voltage is filtered by resistor 237 and capacitor 238 and introduced into the base of transistor 241 through resistor 239. At this point, it is balanced against the set point potentiometer signal from resistor 242 by way of resistor 243. Should the voltage fed back into pins 191, 192 and 193 exceed the predetermined level, the negative signal (through resistor 237) at the base of transistor 241 will exceed the positive signal (through resistor 243) and cut off transistors 241 and 244. This will produce a positive-going signal at the common collector of transistors 241 and 244. This signal will raise the potential of the emitter of transistor 245 (far right) causing conduction through the base to emitter of this transistor and through diode 246 to pin 201. Raising the potential of pin 201 will reduce or limit the frequency of the oscillator 111 and thereby prevent over voltage. Conduction of the base to emitter junction of transistor 245 furthermore turns on this transistor thereby energizing transistors 247 and 248 through resistor 249 and turning on the "inverter" lamp 207. Illumination of this lamp indicates that the system is operating on "inverter voltage" limit.

The "coil voltage" feedback and amplifier system including transistors 251, 252 and 253 operate in identical fashion. Note that whichever of the three amplifiers operates with the most positive output will control the potential of the line 227 to pin 201, and turn on its corresponding lamp through transistor 228, 245 or 253 (unless some input to conductor X, from another module, is even more positive).

Those elements shown in FIG. 14 which have not been described are for biasing, filtering and other functions having no relation to the invention.

LOCKOUT AND TOT MODULE

The lockout and TOT module 106 (FIG. 12) serves two basic functions. These are: first, to provide signals representative of the turnoff time (TOT) available at the SCR module 91 (the signals being conveyed to the limit module); and second, to monitor the condition of the SCRs and provide a means for tripping the circuit if an SCR firing is attempted when the conditions are not proper.

Figure 15:
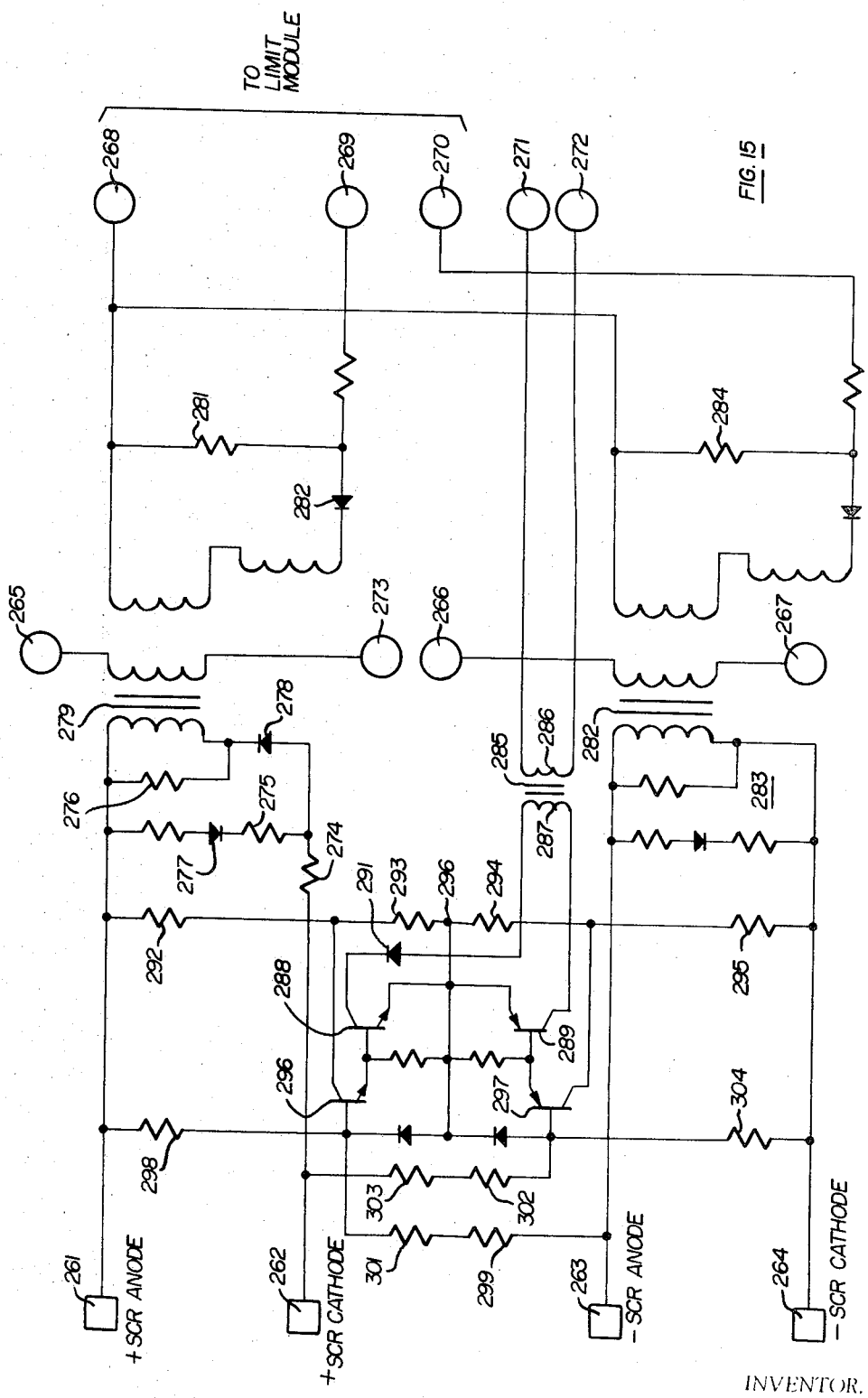
FIG. 15 is a circuit diagram of a lockout and turnoff time module included in the system of FIG. 12.

To accomplish the foregoing functions, i is necessary to provide inputs to the module 106 from the SCR module, and outputs from the module 106 for interconnection to other control modules. Referring to FIG. 15, high voltage input signals enter at terminals 261, 262, 263 and 264 while low voltage output signals leave the module by way of the other terminals 365--273.

The development of TOT signals is accomplished as described below. Connections are made from the positive SCR 42a to pins 261 and 262. The anode and cathode points are illustrated. Resistors 274, 275 and 276 and diode 277 constitute a voltage divider from pin 261 to pin 262. These provide a voltage across diode 278 and the primary transformer 279 which is approximately one-tenth the voltage across the SCR 42a. When this SCR is blocking forward voltage, pin 261 is positive, producing a positive voltage from the top of resistor 276 to the bottom of resistor 275. The polarity of this signal is such that diode 278 is in the blocking direction and no voltage appears across the primary of transformer 279. When the SCR cathode is positive with respect to the anode (the condition prevailing during reverse blocking or TOT), pin 262 is positive with respect to pin 261 thereby producing a positive voltage from the bottom of resistor 275 to the top of resistor 276. This signal is blocked by diode 277 but is conducted by diode 278 and thereby produces a signal on the primary of transformer 279. The primary will, therefore, be energized so long as reverse polarity exists on the SCR 42a. This produces a negative-going signal at the upper end of the primary winding during SCR TOT. Correspondingly, a negative-going signal appears at the lower end of the secondary winding. This produces a negative signal at the bottom of resistor 281 (through diode 282) and a negative-going output at pin 269. Connection is made from pins 268 and 269 to the limit module for monitoring the TOT and limiting power output accordingly, as will be described.

The negative SCR 42b is monitored in an identical fashion. The SCR voltage is impressed on pins 263 and 264 and operate on the primary of transformer 282 by way of a voltage divider 283 substantially identical to that described above for transformer 279. The corresponding secondary output signals appear across resistor 284 and at pins 270 and 268. In 268 is obviously a common for both TOT outputs.

The third windings connected to terminals 265, 273, 266 and 267 are available for special control functions. They are not normally used, and the conventional system incorporates no connections to them.

The second function performed by the module of FIG. 15 is to monitor the SCR condition and prevent firing if SCRs are not in the proper state. To accomplish this function, pins 271 and 272 are interconnected to the oscillator 111 and must provide a low impedance path for the pulse generated at the oscillator during the firing sequence. This pulse will be positive-going at pin 271, thereby producing a positive voltage on the upper end of the primary 286 of transformer 285. In order to provide a low impedance path for this pulse, it is essential to effectively short circuit the secondary winding 287 of transformer 285. This is accomplished if transistors 288 and 289 are in the "on" state. Thus, if the SCRs are in the proper condition, transistors 288 and 289 will be "on," thereby effectively shorting the secondary through diode 291. If the SCRs are not in the proper state, either transistor 288 or 289 will be in the "off" condition, thereby opening the short and resulting in a high impedance circuit as viewed from pins 271 and 272.

Proper operation of the power circuit demands that neither SCR be conducting at the time the other is fired. That is, during the time interval between firing of the positive SCR 42a and the firing of the negative SCR 42b, the normal sequence would entail a conduction period on the part of the positive SCR, followed by an adequate TOT to extinguish the SCR, followed by a reapplied forward voltage on the positive SCR: all this occurring before the firing of the negative SCR. If an SCR is not in the forward blocking condition at the time of normal firing of the other SCR, this generally indicates that a failure to turn off occurred. Under these conditions it is not safe to fire the second SCR since a fault from the positive bus to the negative bus can occur through the simultaneous conduction of both SCRs. As will be described below, therefore, the circuit demands that a proper level of forward voltage exist on both SCRs in order to fire either.

Terminals 261 and 264, in addition to being SCR terminals, are also the positive and negative buses, respectively, of the DC power supply. Therefore, the connection of a divider circuit made up of resistors 292, 293, 294 and 295 provides, at the junction 296 of resistors 293 and 294 a center point midway between the potentials of the two main buses. Transistors 288, 289, 296, 297 all operate with their emitter circuits at approximately this potential, while resistors 293 and 294 provide a low voltage power supply for transistors 296 and 297. The latter transistors must be turned on by proper signals at their bases in order to turn on transistors 288 and 289, respectively.

Turn-on of the latter transistors provides a short on the primary transformer 285, as previously mentioned.

Examining, first, transistor 296, note that two inputs are provided to the base. One of these is through resistor 298 from the positive bus, the other through resistors 299 and 301 to the anode of the negative SCR 42b. Note that the former input is of a polarity tending to turn on transistor 296, while the latter is of a polarity tending to reverse bias the base of transistor 296 and turn it off. The current through resistor 298 must therefore exceed the current through resistors 299 and 301 in order to turn transistor 296 on. If, for example, the negative SCR 42b were conducting, pin 263 would be at essentially the potential of the negative bus. Since the emitter and base of transistor 296 are essentially at a potential midway between that of the positive and negative buses, and since resistor 301 is a greater resistance than the sum of resistors 299 and 301, under these conditions the current flow through resistor 298 would be less than the current flow through resistors 299 and 301 and transistor 296 would be in the "off" condition. In order to turn this transistor "on," it is necessary that the negative SCR be off and that the potential of pin 263 be approximately 125 volts positive with respect to pin 264 (indicating that the SCR group is blocking at least this must voltage) in order that the current through resistors 299 and 301 be reduced to a level equal to that through resistor 298. A slightly higher positive potential at pin 263 will cause the current through resistors 299 and 301 to be less than that through resistor 298, providing for a base drive at transistor 296. This transistor will therefore be turned on only if the negative SCR is blocking approximately 125 volts in the forward direction.

By similar action it can be seen that transistor 297 will be turned "on" only if approximately 125 or more volts exist across the positive SCR 42a so that the current through resistors 302 and 303 (tending to reverse bias transistor 297) is reduced to a level lower than the current through resistor 304 (tending to turn on 297).

If the connections to either of pins 262 or 263 are open circuited, thereby removing the feedback to this module, the potential of these pins will be held respectively at approximately that of the positive bus and the negative bus through the relatively low impedance of the voltage dividers associated with the TOT system. This provides fail safe operation. If the signals to pins 268—272 are missing entirely, it can be shown that transistors 296 and 297 will not be turned on and, again, the system will fail safe. That is SCR firing will not be permitted.

LIMIT MODULE

Figure 16:
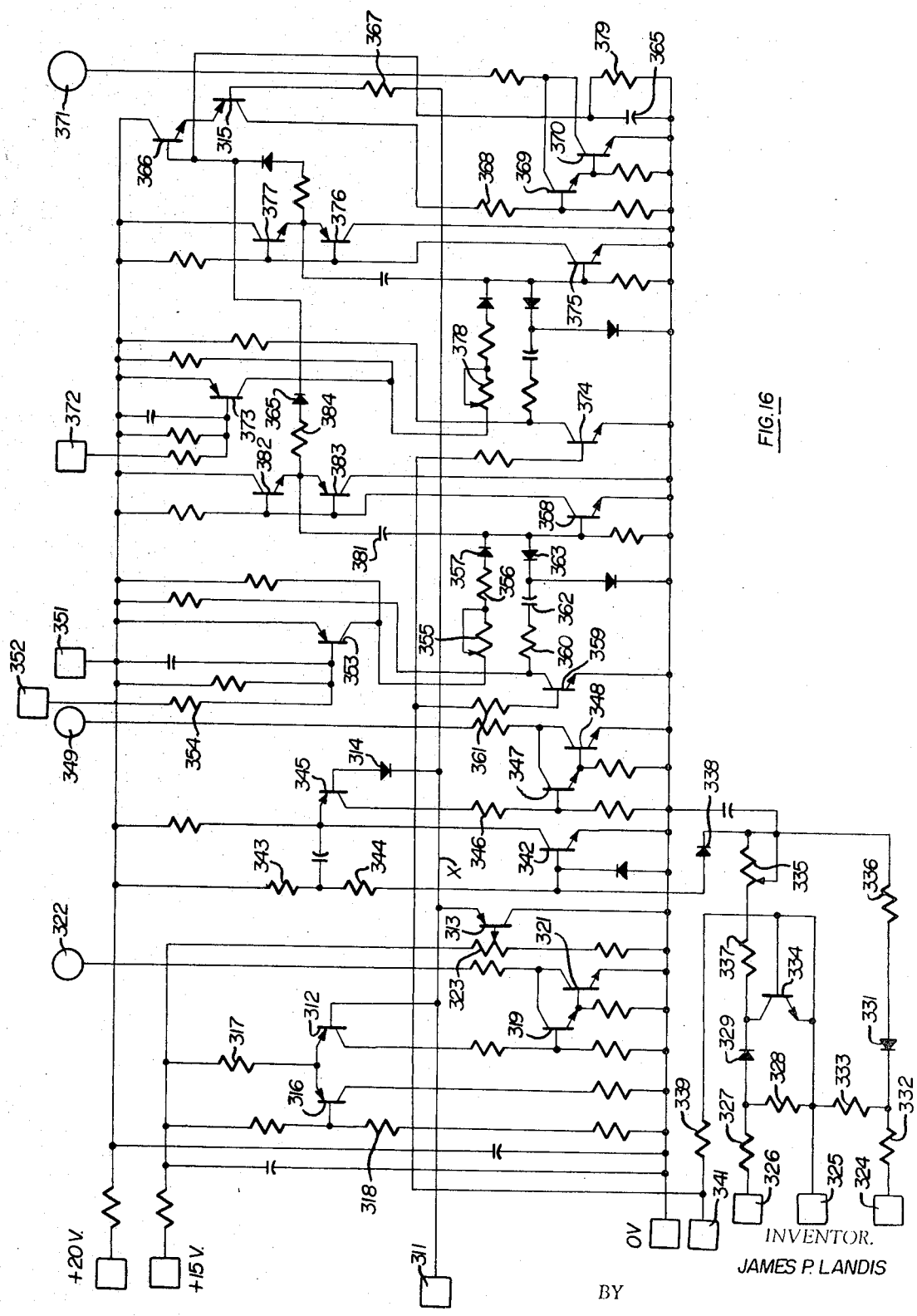
FIG. 16 is a circuit diagram of a limit module included in the system of FIG. 12.

As discussed and illustrated in the section on Basic Operating Principles of the Control, various inputs can be applied to the control line (designated as X) used as the input to the oscillator. The limit module 107 (FIG. 12) operates exclusively to introduce signals into this control line to limit the frequency of operation in response to various circuit loading or operating conditions which may prevent operation at set power level. That is, the normal level of the input signal to the oscillator should be set by the power control of the voltage and power regulator 104. However, if circuit conditions prevent achieving the set power for one reason or another, inputs from the limit module 107 may override the input from the power control to restrict the frequency to a lower level. These various inputs are described in this section referring to FIG. 16. In reading this section, it should be recognized that the input 123 to the oscillator 111 is tied to pin 311 of the limit module and that the various diode or transistor connected inputs to this line are as follows: transistor 312, transistor 313, diode 314 and transistor 315. Each of these is backed up by an appropriate controlling function as described below.

The input to the control line X by way of the emitter to base junction of transistor 312 is the high frequency limit. The potential at the emitter of transistor 312 is set by the emitter follower consisting of transistor 316 and resistor 317. The emitter of transistor 316 will be at a potential slightly more positive than the base thereof, which in turn is set by the high frequency set pot 318. Should the potential of pin 311 attempt to drop negative with respect to the emitters of transistors 312 and 316, transistor 312 will conduct through its emitter to base junction thereby preventing a further negative drop of pin 311. Simultaneously, transistor 312 conducts emitter to collector, energizing transistors 319 and 321 and thereby turning on a "high frequecy" lamp connected to pin 322.

Resistor 323 and transistor 313 serve as the low frequency limit on the system. Note that with transistor 313 connected as shown, any tendency for the potential of pin 311 to rise more positive than the base of transistor 313 will cause this transistor to conduct and prevent such positive rise. Since a positive-going swing on the part of pin 311 corresponds to a decreasing frequency of the oscillator, resistor 323 is used to set the low frequency limit of the system.

The circuit providing an input to pin 311 through diode 314 limits the frequency on the basis of phase relationship between the SCR firing and the voltage on the inverter output. Reference is made in the section on the basic operation of the power system, that under some loading conditions a peak power capability exists beyond which increasing frequency causes decreasing rather than increasing power. In order to prevent system operation above this peak power point, it is found that limiting the angle of lead of the inverter firing signals relative to the tank voltage is required. This circuit accomplishes this function. Operation of the circuit is as follows: Pins 324, 325 and 326 are connected to the secondary of the "inverter output" potential transformer in module 110. Pin 325 is connected to a secondary center tap and pins 324 and 326 respectively to the outboard ends of the secondary winding. Relative to pin 325, then, the potentials at pins 324 and 326 are 180° out of phase with each other, but equal in magnitude. Each of these voltages is impressed on a voltage divider (for example, resistors 327 and 328). Diode 329 rectifies the output of one of these voltage dividers, 321 rectifies the output of the other 332, 333. Consequently, at the cathode of diode 329 would appear a half-wave rectified positive-going signal whereas at the anode of diode 331 would appear a half-wave rectified negative-going signal. Ignoring for a moment the presence of transistor 334, each of the aforementioned voltages would produce a corresponding current flow. Assuming for the moment that the junction of resistors 325 and 326 is at ground potential, the current through resistors 337 and 335 would exceed the current through resistor 336 since the former resistance is made lower and the voltages at the corresponding diodes are equal. Thus the circuit would tend to produce a reverse current through diode 338, thereby back biasing this diode. Decreasing the resistance of resistor 335 would increase this effect even more.

The function of resistor 339 connected to pin 341 is to introduce the effect of the SCR firing into this circuit. Entering at pin 341 is the output signal from pin 142 of the oscillator and flip-flop module (the same signal which fires the positive SCR). Thus, whenever the positive SCR is fired, the signal at pin 341 turns on transistor 334 which shorts the output at diode 329. This removes the current through resistors 332 and 335. As the firing of the SCRs is increased infrequency, the phase angle tends to advance relative to the phase angle of the tank voltage, so that the transistor 334 shorts out the output at diode 329 for a greater and greater period of the total half cycle of output voltage (this action initially begins as a shorting out at the trailing edge of the half cycle of output from diode 329 moving toward the leading edge of the half cycle as SCR firing is advanced). Thus, as the firing advances, the effective voltage available at the cathode of diode 329 drops, and consequently so does the current through resistors 337 and 335. At some point in the process of advancing the SCR firing, the current through these resistors will diminish to a level lower than that through resistor 336. At this point, current will be drawn through diode 338 from the base circuit of transistor 342. The firing angle at which this occurs can be adjusted by potentiometer 335, with a low resistance setting corresponding to a large angle of advance before current will flow through diode 338.

Note that transistor 342 is normally held in the "on" condition by a current flow through resistors 343 and 344 into its base. However, as current is drawn through diode 338, this current will be shunted away from the base and ultimately cut off transistor 342. When it cuts off, its collector voltage will rise and establish a current flow through the emitter-base junction of transistor 345 through diode 314 into the line X connected to pin 311. This action tends to raise the potential of pin 311 positive and reduce the frequency of the oscillator 111. Simultaneously, the current flow through the emitter-base junction of transistor 245 turns this transistor on to provide a flow from its collector through resistor 346 and into the circuit including transistors 347 and 348 to energize the lamp connected to pin 349.

The remaining circuitry on this module relates to measurement of and control in response to the turnoff time (TOT) of the two SCRs or SCR groups. As mentioned in the section on inverter theory, as frequency and power are increased, the operation of the power circuit is such that the available TOT for the SCRs diminishes. Thus, there is some limiting level of power beyond which it is not safe to operate owing to inadequate TOT. This time is monitored by the control, and limiting action provided to prevent its becoming too short. The manner of accomplishing this function is described below.

Transformers 279 and 282 are located on the lockout and TOT module (FIG. 15) and connected by external wiring to the limit module. For example, in the case of the circuitry for the positive SCR 42a, the output terminals 268, 269 of the corresponding transformer 279 are connected respectively to pins 351 and 352 of the limit module. The voltage on pin 352 is a negative-going signal, the negative-going signal being a pulse proportion to (in voltage) and equal to (in time duration) the reverse voltage on the corresponding SCR. Thus, during the time the SCR is reverse biased, a negative signal is impressed on the base of transistor 353 through resistor 354, thereby turning on transistor 353. It will therefore remain on for as long as the reverse bias persists on the SCR 42a and during this time will feed a current through resistors 355 and 356 and diode 357 into the base circuit of transistor 358. The total charge injected into the base circuit of transistor 358 is therefore proportional to the current times the time interval of "on" condition or, since the current is always of constant magnitude, the charge is proportional to the "on" time of transistor 353. This in turn makes it proportional to the time duration of reverse bias on the SCR 42a.

Also connected to the base of transistor 358 is a second circuit producing a current flow away from the base as follows. Transistor 359 is driven at its base through resistor 361 by the input at pin 341 from the oscillator. Thus, at each firing of the positive SCR 42a, transistor 359 is turned on for 180 electrical degrees. This produces a negative-going swing at the collector of transistor 259 and discharges capacitor 362 through resistor 360 and transistor 359. This produces a negative flow of current from the base of transistor 358 through diode 363. The net charge injected into the base circuit of transistor 358 is therefore the difference between that flowing through diode 357 and that flowing through diode 363. If the charge through diode 357 exceeds that through diode 363, transistor 358 will tend to be turned "on." If the charge through diode 363 predominates transistor 358 will tend to be turned "off." The circuit consisting of transistor 358, capacitor 381 and double emitter follower 382 and 383 constitutes an integrator, the output of which (at the emitter of 382) is an integration of the net input signal at the base of transistor 358.

With a long TOT and the input through diode 357 predominating, and with transistor 358 generally in the "on" condition, the output of the integrator will be generally negative. Conversely, with a short TOT and the input at diode 363 predominating, the output of the integrator will swing positive. Under the latter circumstances, a current flow will occur through resistor 384 and diode 385 charging capacitor 365 and establishing a current flow through the base-emitter junction of transistor 366, the emitter-base junction of transistor 315 and through resistor 367 into the line X connected to pin 311. This will tend to swing the line X connected to pin 311 in a positive direction and reduce the frequency of the oscillator 111, thereby limiting power and preventing excessively short SCR TOT. At the same time, the flow of current through the emitter-base junction of transistor 315 will turn this transistor on, establishing a circuit through resistor 368 to energize transistor 369 and 370, thereby energizing the TOT lamp connected to pin 371. Capacitor 265 is used to dampen the response of this system. For example, when a short TOT begins to occur, capacitor 365 is very rapidly charged through the low resistance of resistor 384. When the short TOT condition is relieved, and the potential of the emitter of transistor 382 (integrator output) swings negative, capacitor 365 can discharge only slowly through the base to emitter junction of transistor 366. This permits pin 311 to swing negative only very slowly and prevents an abrupt increase in frequency which could cause the system to revert to an excessively short TOT again. Capacitor 365 can also discharge through the very high impedance of resistor 379 connected in parallel with it.

The aforementioned circuit is exactly duplicated starting at pin 372 entering transistor 373 and including transistors 374, 375, 376 and 377 and associated parts. These all operate on the signal from the negative SCR 42b introduced at pin 372. Thus, short TOT on the part of either or both SCRs will actuate one or both of the circuits described herein and result in a limitation of frequency. A limited range of adjustment of the TOT is provided by resistors 355 and 378. By reducing the resistance in these adjustable resistors, the allowable TOT is shortened through permitting a heavier charge flow through, for example diode 357 under the conditions of a given TOT at the SCR.

While the circuits described above illustrate a preferred embodiment, it will be obvious, to one skilled in the art, that numerous alterations to the circuits could be made without departing from the spirit of the invention. To name only one example, the inverter circuit of FIG. 10 can easily be adapted to a bridge configuration.

The foregoing has described the system with special reference to induction heating. Obviously other loads of relatively high inductive reactance requiring alternating current power could constitute the element L of FIG. 10 in place of an induction heating coil.

Finally, it will be recognized that the elements L 52 and C 51 of FIG. 10, which have heretofore been treated as the load, can equally well be an inductor and capacitor, respectively, incorporated as part of the power supply. So arranged, these components constitute an "electrical flywheel" in parallel with which an external load can be connected. Such a system is capable of furnishing well regulated sine convenient power to a wide variety of loads of leading, lagging, or unity power factor. In such a system, a convenient arrangement incorporates a second winding on inductor L from which the load can be fed, thereby providing isolation as well as complete freedom of choice regarding level of output voltage.

I claim:

1. In a power supply, an inverter circuit comprising first and second DC voltage supply lines of opposite polarity, a capacitor voltage divider connected across said lines providing first and second voltage sources in series, a tank circuit connected to a point between said voltage sources and including inductance means and capacitance means in parallel with each other, a first conduction path connected between said first line and said tank circuit including a first semiconductor controlled rectifier connected to said first line, a first inductor connected to said rectifier, a first diode connected to said first inductor and a second inductor connected between said first diode and said tank circuit, a first capacitor connected across said first rectifier and said first inductor, a second diode connected between said second line and a point between said first diode and said second inductor, a second conduction path connected between said second line and said tank circuit, said second conduction path including a second semiconductor controlled rectifier connected to said second line, a third inductor connected to said second rectifier, a third diode connected to said third inductor, and a fourth inductor connected between said third diode and said tank circuit, said second rectifier and said third diode being pole oppositely to said first rectifier and first diode, a second capacitor connected across said second rectifier and said third inductor, a fourth diode connected between said first line and a point between said third diode and said fourth inductor, and means for supplying firing signals to said semiconductor controlled rectifiers for firing the same alternately, with said first and second capacitors discharging through the respective rectifier when fired and recharging oppositely to reverse bias the same for a predetermined time during which discharge takes place externally of the rectifier.

2. A static, single-phase, variable frequency power supply for converting low frequency alternating current from a source thereof to high frequency alternating current in a load including inductance and capacitance in parallel with each other, the load being either external or internal with respect to the power supply, said power supply including in combination, means for connection to said source to supply low frequency alternating current, rectifying means for converting said alternating current to direct current, inverter circuit means coupled to said rectifying means for converting said direct current to high frequency alternating current in said load, said inverter circuit means including controllable electron devices fired repetitively by control signals received from said load to produce said high frequency current, and an oscillator circuit coupled to said electron devices for supplying the control signals thereto, the frequency of said oscillator circuit being variable upon receipt of said control signals to control the frequency of said high frequency alternating current, said oscillator circuit including (b 1) a flip-flop circuit module integrated with said oscillator circuit having an output connected to at least one firing amplifier, (2) a voltage and power regulator circuit module having an output connected to said oscillator circuit, and (3) a lockout and limit circuit module interconnected between said oscillator circuit and said inverter circuit and between said oscillator circuit and said voltage and power regulator circuit to thereby control the firing of said electron devices in response to the power requirement of said load.

3. The power supply as claimed in claim 2, including further a first feedback means applying feedback signals to said oscillator circuit from the path of said high frequency alternating current, and power set point control means associated with said oscillator circuit for comparing the power level of the feedback signal with a set level to establish the frequency of the oscillator circuit at a value to produce a set power level in said load.

4. The power supply as claimed in claim 3, including a second feedback means applying second feedback signals to said oscillator circuit form the path of said high frequency alternating current, and voltage set point control means associated with said oscillator circuit for comparing the voltage level of said second feedback signals with a set level to establish the frequency of the oscillator circuit at a value to produce a set voltage level in said load.

5. The power supply as claimed in claim 1, in which said load exhibits peak power characteristics such that increasing frequency of said high frequency alternating current therein increases power up to a certain level beyond which power decreases, and in which said oscillator circuit includes limiting circuit means for comparing the phase angle of the control signals with that of the output of said inverter circuit means to limit the frequency of said oscillator circuit to a value to produce the peak power in said load even though the set power level has not been reached.

6. The power supply as claimed in claim 5, in which said electron devices of said inverter circuit means comprises a first semiconductor controlled rectifier, and said inverter circuit means further includes a first voltage source, inductance means and a first diode in series with said first semiconductor controlled rectifier and said load, capacitance means in parallel with said first semiconductor controlled rectifier and at least a portion of said inductance means and a second voltage source and a second diode in parallel with said first voltage source and said first diode and opposite in polarity thereto.

7. The power supply as claimed in claim 6, in which said inverter circuit means further includes a second semiconductor controlled rectifier, a second inductance means and a third diode in series with said second voltage source and said load, second capacitance means in parallel with said second semiconductor controlled rectifier and at least a portion of said second inductance means, and a fourth diode connecting said first voltage source to said last named series path and opposite in polarity to said third diode.

8. The power supply as claimed in claim 7, in which said oscillator means includes a unijunction transistor having an emitter and an output portion, a capacitor connected to said emitter, a current source connected to said emitter for charging said capacitor to a level at which it discharges through said emitter, and means responsive to said discharge to produce said control signals and supply the same to said semiconductor controlled rectifiers for firing the same alternately, said first and second capacitors discharging through said semiconductor controlled rectifies upon respective firing thereof and recharging reversely to produce reverse voltage thereon for a turnoff time before forward voltage is reapplied to said rectifiers.

9. The power supply as claimed in claim 8, in which said oscillator means includes lockout circuit means for monitoring the condition of the semiconductor controlled rectifiers to prevent firing thereof unless forward voltage exists on both of said rectifiers at the time for firing.

10. The power supply as claimed in claim 9, in which said lockout circuit means comprises impedance means connected to said unijunction transistor for blocking the output thereof, means for shorting said impedance means to prevent such blocking it forward blocking voltage exists on said rectifiers and comparison circuit means connected to said rectifiers and to said shorting means for comparing the operating potentials of the first and second controlled rectifiers to activate said shorting means only if blocking voltage exists on both of said rectifiers.

11. The power supply as claimed in claim 10, in which said limiting circuit means further includes a monitoring circuit connected to said semiconductor controlled rectifiers for monitoring the duration of reverse voltage thereon, and means responsive to said monitoring circuit for controlling said current source of said oscillator means to reduce the frequency thereof as the duration of said reverse voltage becomes shorter than a reference value.